(12) United States Patent
Parron et al.

(10) Patent No.: US 11,087,630 B2
(45) Date of Patent: Aug. 10, 2021

(54) DRONE-BASED TRAFFIC CONTROL AND V2X ENHANCEMENTS

(71) Applicant: Intel Corporation, Santa Clara, CA (US)

(72) Inventors: Jerome Parron, Fuerth (DE); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 16/235,258

(22) Filed: Dec. 28, 2018

(65) Prior Publication Data

US 2020/0211402 A1    Jul. 2, 2020

(51) Int. Cl.
*G08G 5/00* (2006.01)
*G08G 5/04* (2006.01)
*B64C 39/02* (2006.01)

(52) U.S. Cl.
CPC ......... *G08G 5/0021* (2013.01); *B64C 39/024* (2013.01); *G08G 5/003* (2013.01); *G08G 5/0008* (2013.01); *G08G 5/0069* (2013.01); *G08G 5/045* (2013.01); *B64C 2201/12* (2013.01); *B64C 2201/146* (2013.01)

(58) Field of Classification Search
CPC .............................. G08G 5/0021; B64C 39/024
See application file for complete search history.

(56) References Cited

U.S. PATENT DOCUMENTS

| | | | |
|---|---|---|---|
| 2017/0097640 A1* | 4/2017 | Wang | G05D 1/0088 |
| 2018/0061251 A1* | 3/2018 | Venkatraman | B64C 39/02 |
| 2018/0162409 A1* | 6/2018 | Altmannshofer | G08G 1/096708 |
| 2018/0239356 A1 | 8/2018 | Hall | |
| 2018/0267562 A1 | 9/2018 | Maccready et al. | |
| 2020/0207474 A1* | 7/2020 | Foggia | G05D 1/0676 |

FOREIGN PATENT DOCUMENTS

| | | |
|---|---|---|
| JP | 2002117499 | 4/2002 |
| KR | 101668416 | 10/2016 |

OTHER PUBLICATIONS

"International Application Serial No. PCT US2019 065686, International Search Report dated Mar. 30, 2020", 3 pgs.
"International Application Serial No. PCT US2019 065686, Written Opinion dated Mar. 30, 2020", 5 pgs.

\* cited by examiner

*Primary Examiner* — Jess Whittington
(74) *Attorney, Agent, or Firm* — Schwegman Lundberg & Woessner, P.A.

(57) ABSTRACT

Methods and apparatuses for vehicles, including unmanned aerial vehicles (UAV). A method for traffic control can include detecting a traffic condition; determining whether to adjust a virtual traffic sign responsive to detecting the traffic condition; and adjusting the virtual traffic sign based on the traffic condition. Adjusting the virtual traffic sign can include encoding a message for transmission to a base station within a range of the virtual traffic sign, the message including at least one of a virtual traffic sign type and a virtual traffic sign value. Other methods, systems, and apparatuses are described.

7 Claims, 13 Drawing Sheets

DRONE-BASED TRAFFIC CONTROL AND V2X ENHANCEMENTS

TECHNICAL FIELD

Some aspects of the present disclosure relate to drone communication. More specifically, some aspects relate to drone traffic control, and some further aspects relate to drone-based vehicle steering collaboration and remote control.

BACKGROUND

Current traffic control mechanisms are directed to vehicles that travel on roads in a two-dimensional space. Unmanned aerial vehicles (UAVs), however, can travel in three-dimensional space. Therefore, there exists a general need for three-dimensional traffic control. Traffic control can also be enhanced by allowing the ability for one vehicle to control another.

DETAILED DESCRIPTION

Drones, which can also be referred to as unmanned aerial vehicles, are gaining in popularity and it is expected that the number of UAVs in use will continue to increase. As the number of UAVs increases, operators and municipalities will wish to provide traffic coordination to avoid problems such as collisions. Current vehicle-to-everything (V2X) specifications are provided for vehicles traveling in two-dimensional space on roads on the Earth's surface. For example, signaling according to V2X specifications can support reports of road hazards, emergency braking support, left-turn indicators, etc. Future V2X standards versions may be expanded to cover UAV use cases, including three-dimensional (3D) traffic lanes, route selection, and traffic coordination.

Example Radio Architecture

Figure 1:
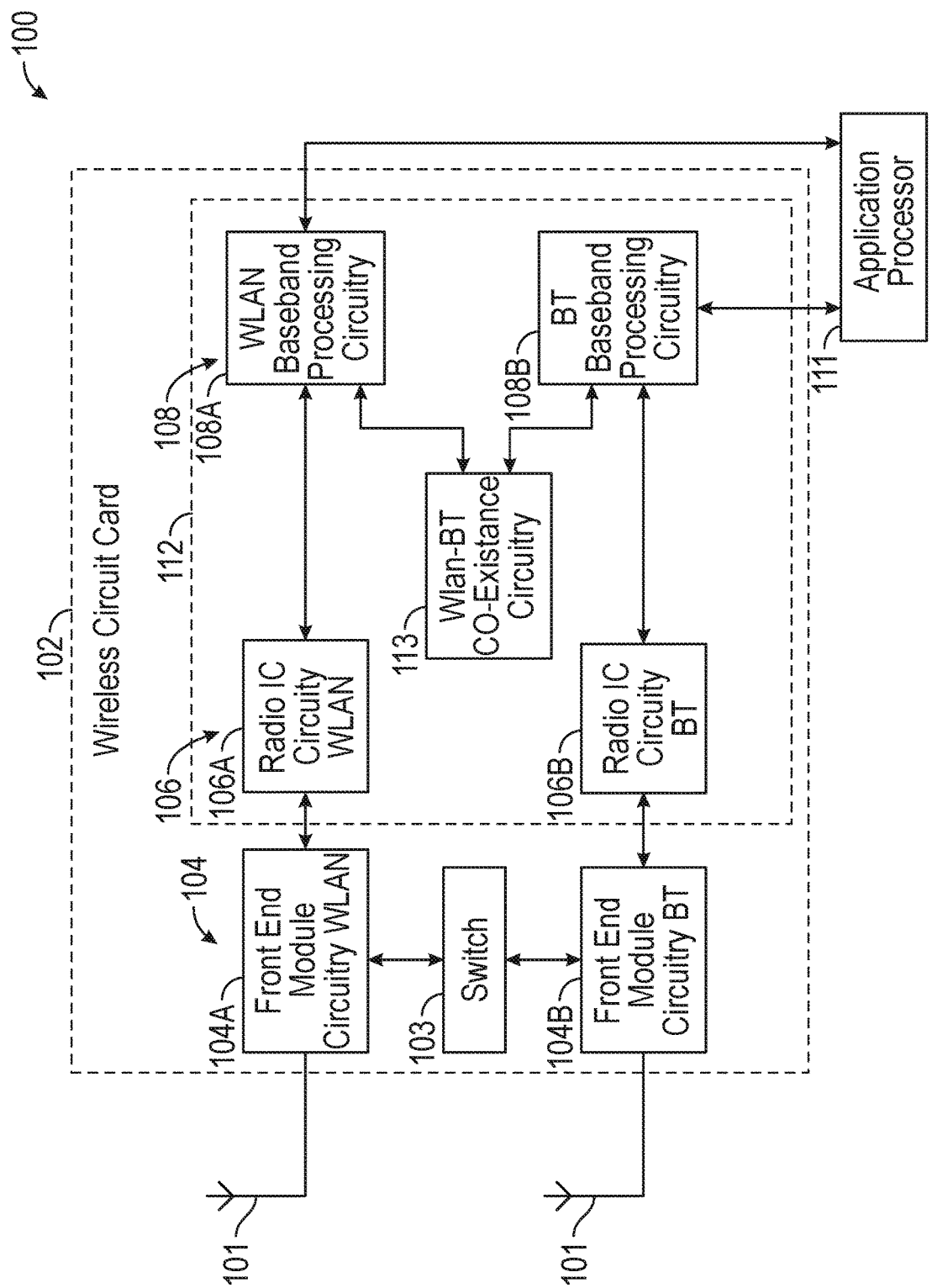
FIG. 1 is a block diagram of a radio architecture in accordance with some 20 aspects.

FIG. 1 is a block diagram of a radio architecture 100 in accordance with some aspects. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although aspects are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission over a wireless communication network by one or more of the antennas 101. In addition, FEM circuitry 104B may also include a transmit signal path which may include circuitry configured to amplify BT signals provided by the radio IC circuitry 106B for wireless transmission by the one or more antennas. In the aspect of FIG. 1, although FEM 104A and FEM 104B are shown as being distinct from one another, aspects are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the aspect of FIG. 1, although radio IC circuitries 106A and 106B are shown as being distinct from one another, aspects are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown aspect, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, aspects include within their scope the sharing of one or more antennas as between the WLAN and BT FEMs, or the provision of more than one antenna connected to each of FEM 104A or 104B.

In some aspects, the front-end module circuitry 104, the radio IC circuitry 106, and baseband processing circuitry 108 may be provided on a single radio card, such as wireless radio card 102. In some other aspects, the one or more antennas 101, the FEM circuitry 104 and the radio IC circuitry 106 may be provided on a single radio card. In some other aspects, the radio IC circuitry 106 and the baseband processing circuitry 108 may be provided on a single chip or integrated circuit (IC), such as IC 112.

In some aspects, the wireless radio card 102 may include a WLAN radio card and may be configured for Wi-Fi communications, although the scope of the aspects is not limited in this respect. In some of these aspects, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier aspects, radio architecture 100 may be part of a Wi-Fi communication station (STA) such as a wireless access point (AP), a base station or a mobile device including a Wi-Fi device. In some of these aspects, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.1 lax standards and/or proposed specifications for WLANs, although the scope of aspects is not limited in this respect. Radio architecture 100 may also be suitable to transmit and/or receive communications in accordance with other techniques and standards.

In some aspects, the radio architecture 100 may be configured for high-efficiency (HE) Wi-Fi (HEW) communications in accordance with the IEEE 802.1 lax standard. In these aspects, the radio architecture 100 may be configured to communicate in accordance with an OFDMA technique, although the scope of the aspects is not limited in this respect.

In some other aspects, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the aspects is not limited in this respect.

Figure 2:
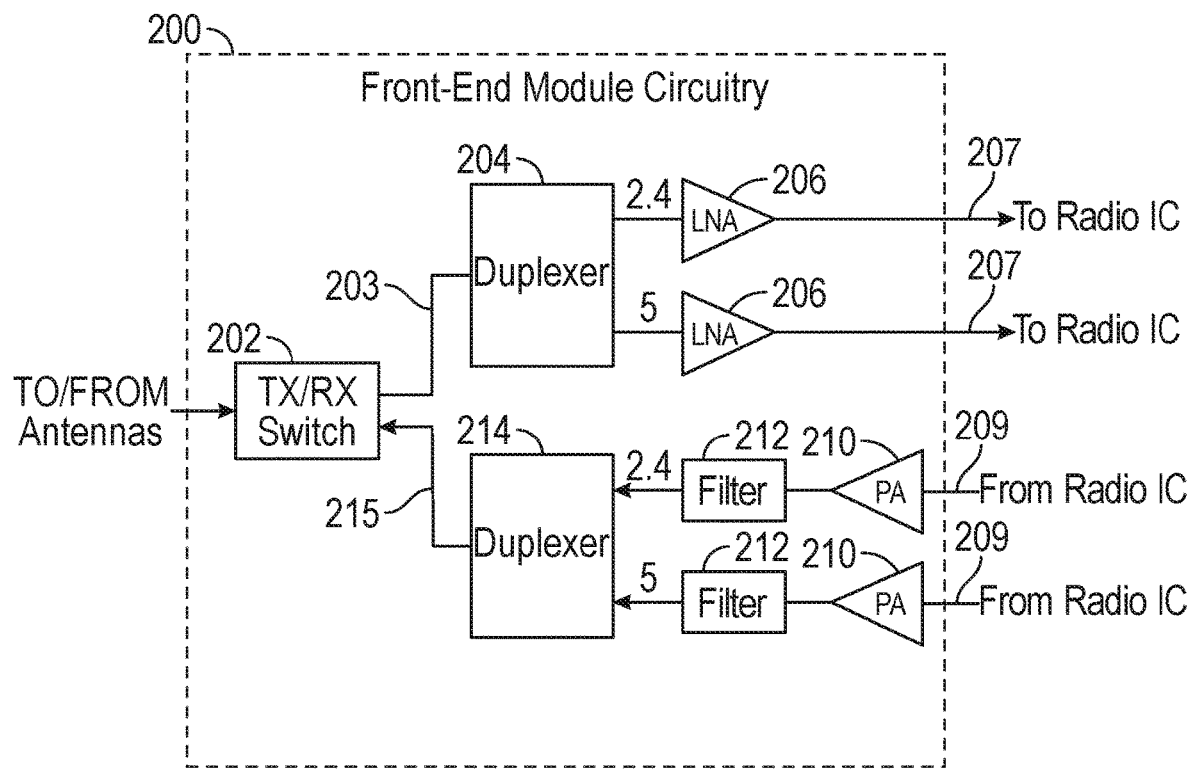
FIG. 2 illustrates a front-end module circuitry for use in the radio architecture of FIG. 1 in accordance with some aspects.

In some aspects, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In aspects that include BT functionality as shown for example in FIG. 1, the radio architecture 100 may be configured to establish a BT synchronous connection oriented (SCO) link and or a BT low energy (BT LE) link. In some of the aspects that include a SCO functionality, the radio architecture 100 may be configured to establish an extended SCO (eSCO) link for BT communications, although the scope of the aspects is not limited in this respect. In some of these aspects that include a BT functionality, the radio architecture may be configured to engage in a BT Asynchronous Connection-Less (ACL) communications, although the scope of the aspects is not limited in this respect. In some aspects, as shown in FIG. 1, the functions of a BT radio card and WLAN radio card may be combined on a single wireless radio card, such as single wireless radio card 102, although aspects are not so limited, and include within their scope discrete WLAN and BT radio cards FIG. 2 illustrates FEM circuitry 200 in accordance with some aspects. The FEM circuitry 200 is one example of circuitry that may be suitable for use as the WLAN and/or BT FEM circuitry 104A/104B (FIG. 1), although other circuitry configurations may also be suitable.

In some aspects, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode aspects for Wi-Fi communication, the FEM circuitry 200 may be configured to operate in either the 2.4 GHz frequency spectrum or the 5 GHz frequency spectrum. In these aspects, the receive signal path of the FEM circuitry 200 may include a receive signal path duplexer 204 to separate the signals from each spectrum as well as provide a separate LNA 206 for each spectrum as shown. In these aspects, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some aspects, BT communications may utilize the 2.4 GHZ signal paths and may utilize the same FEM circuitry 200 as the one used for WLAN communications.

Figure 3:
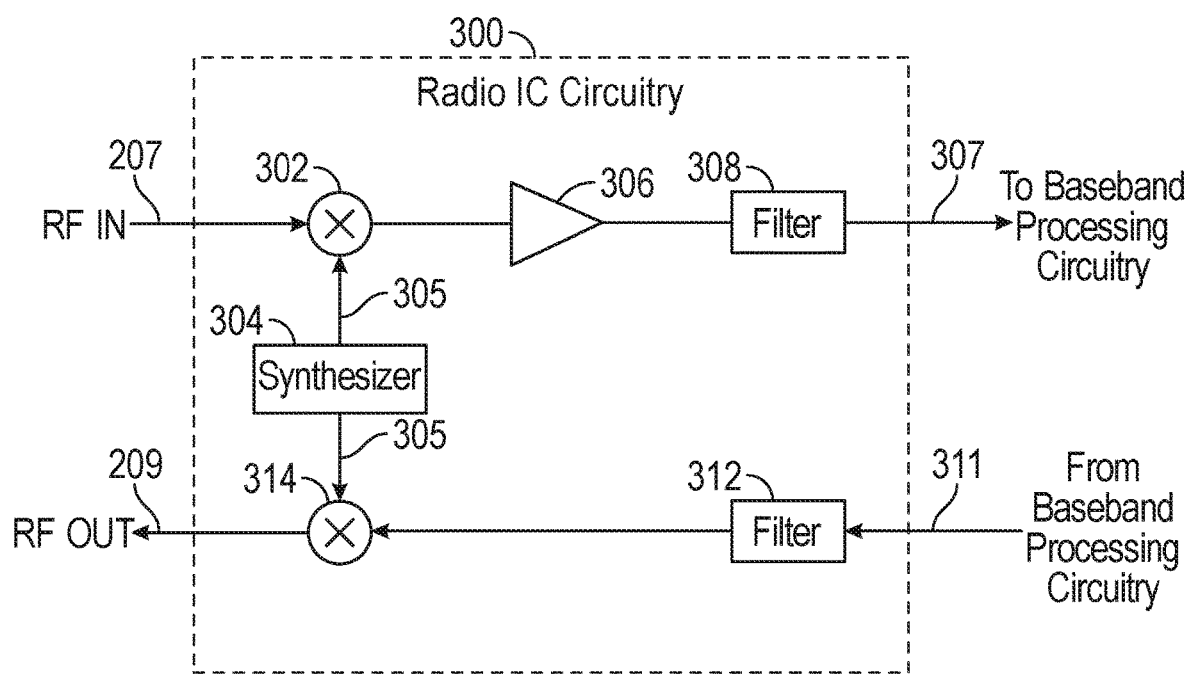
FIG. 3 illustrates a radio IC circuitry for use in the radio architecture of FIG. 1 in accordance with some aspects.

FIG. 3 illustrates radio IC circuitry 300 in accordance with some aspects. The radio IC circuitry 300 is one example of circuitry that may be suitable for use as the WLAN or BT radio IC circuitry 106A/106B (FIG. 1), although other circuitry configurations may also be suitable.

In some aspects, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some aspects, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, aspects where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some aspects, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some aspects, the output baseband signals 307 may be zero-frequency baseband signals, although this is not a requirement. In some aspects, mixer circuitry 302 may comprise passive mixers, although the scope of the aspects is not limited in this respect.

In some aspects, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the aspects is not limited in this respect.

In some aspects, the mixer circuitry 302 and the mixer circuitry 314 may each include two or more mixers and may be arranged for quadrature down-conversion and/or up-conversion respectively with the help of synthesizer 304. In some aspects, the mixer circuitry 302 and the mixer circuitry 314 may each include two or more mixers each configured for image rejection (e.g., Hartley image rejection). In some aspects, the mixer circuitry 302 and the mixer circuitry 314 may be arranged for direct down-conversion and/or direct up-conversion, respectively. In some aspects, the mixer circuitry 302 and the mixer circuitry 314 may be configured for super-heterodyne operation, although this is not a requirement.

Mixer circuitry 302 may comprise, according to one aspect: quadrature passive mixers (e.g., for the in-phase (I) and quadrature phase (Q) paths). In such an aspect, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 305 of synthesizer 304 (FIG. 3). In some aspects, the LO frequency may be the carrier frequency, while in other aspects, the LO frequency may be a fraction of the carrier frequency (e.g., one-half the carrier frequency, one-third the carrier frequency). In some aspects, the zero and ninety degree time-varying switching signals may be generated by the synthesizer, although the scope of the aspects is not limited in this respect.

In some aspects, the LO signals may differ in duty cycle (the percentage of one period in which the LO signal is high) and/or offset (the difference between start points of the period). In some aspects, the LO signals may have a 25% duty cycle and a 50% offset. In some aspects, each branch of the mixer circuitry (e.g., the in-phase (I) and quadrature phase (Q) path) may operate at a 25% duty cycle, which may result in a significant reduction of power consumption.

The RF input signal 207 (FIG. 2) may comprise a balanced signal, although the scope of the aspects is not limited in this respect. The I and Q baseband output signals may be provided to low-nose amplifier, such as amplifier circuitry 306 (FIG. 3) or to filter circuitry 308 (FIG. 3).

In some aspects, the output baseband signals 307 and the input baseband signals 311 may be analog baseband signals, although the scope of the aspects is not limited in this respect. In some alternate aspects, the output baseband signals 307 and the input baseband signals 311 may be digital baseband signals. In these alternate aspects, the radio IC circuitry may include analog-to-digital converter (ADC) and digital-to-analog converter (DAC) circuitry.

In some dual-mode aspects, a separate radio IC circuitry may be provided for processing signals for each spectrum, or for other spectrums not mentioned here, although the scope of the aspects is not limited in this respect.

In some aspects, the synthesizer circuitry 304 may be a fractional-N synthesizer or a fractional N/N+1 synthesizer, although the scope of the aspects is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some aspects, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some aspects, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some aspects, a divider control input (e.g., N) may be determined from a look-up table (e.g., within a Wi-Fi card) based on a channel number and a channel center frequency as determined or indicated by the application processor 110.

In some aspects, synthesizer circuitry 304 may be configured to generate a carrier frequency as the output frequency 305, while in other aspects, the output frequency 305 may be a fraction of the carrier frequency (e.g., one-half the carrier frequency, one-third the carrier frequency). In some aspects, the output frequency 305 may be a LO frequency (fLO).

Figure 4:
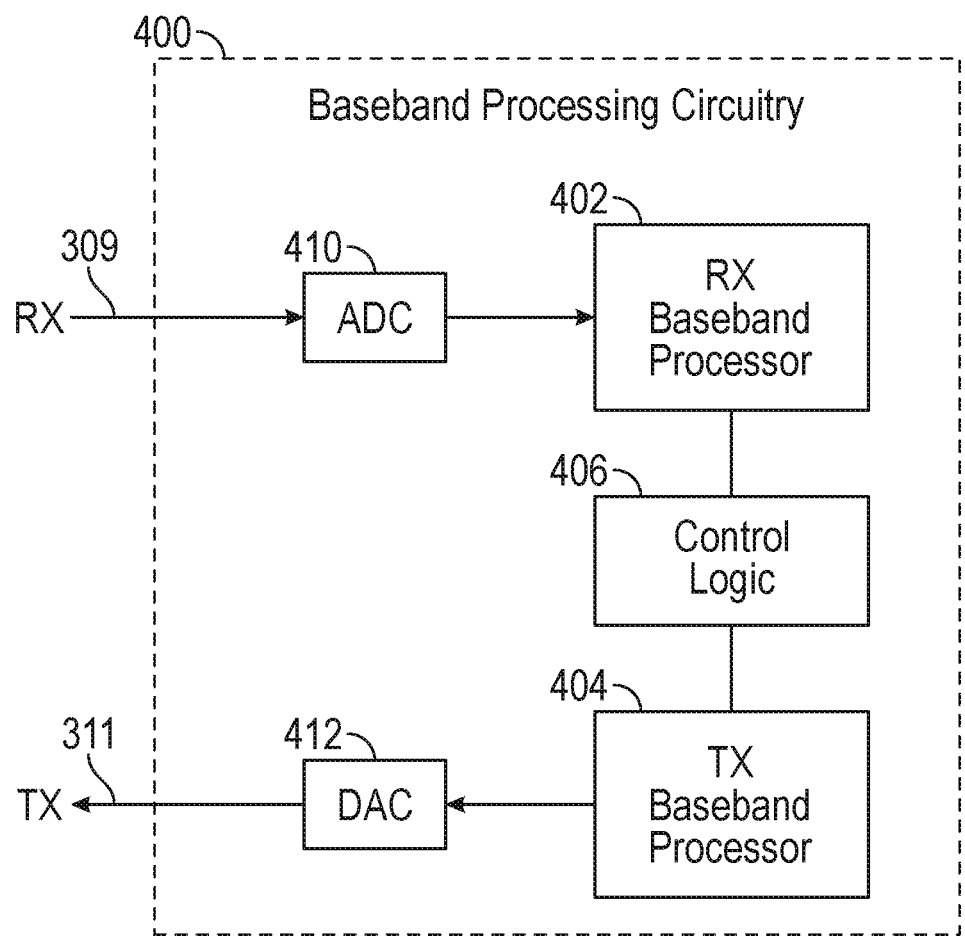
FIG. 4 illustrates a baseband processing circuitry for use in the radio architecture of FIG. 1 in accordance with some aspects.

FIG. 4 illustrates a functional block diagram of baseband processing circuitry 400 in accordance with some aspects. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some aspects (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these aspects, the baseband processing circuitry 400 may also include DAC 412 to convert digital baseband signals from the TX BBP 404 to analog baseband signals.

In some aspects that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some aspects, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some aspects, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects, the antennas may be effectively separated to take advantage of spatial diversity and the different channel characteristics that may result. Antennas 101 may each include a set of phased-array antennas, although aspects are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Example Machine Description

Figure 5:
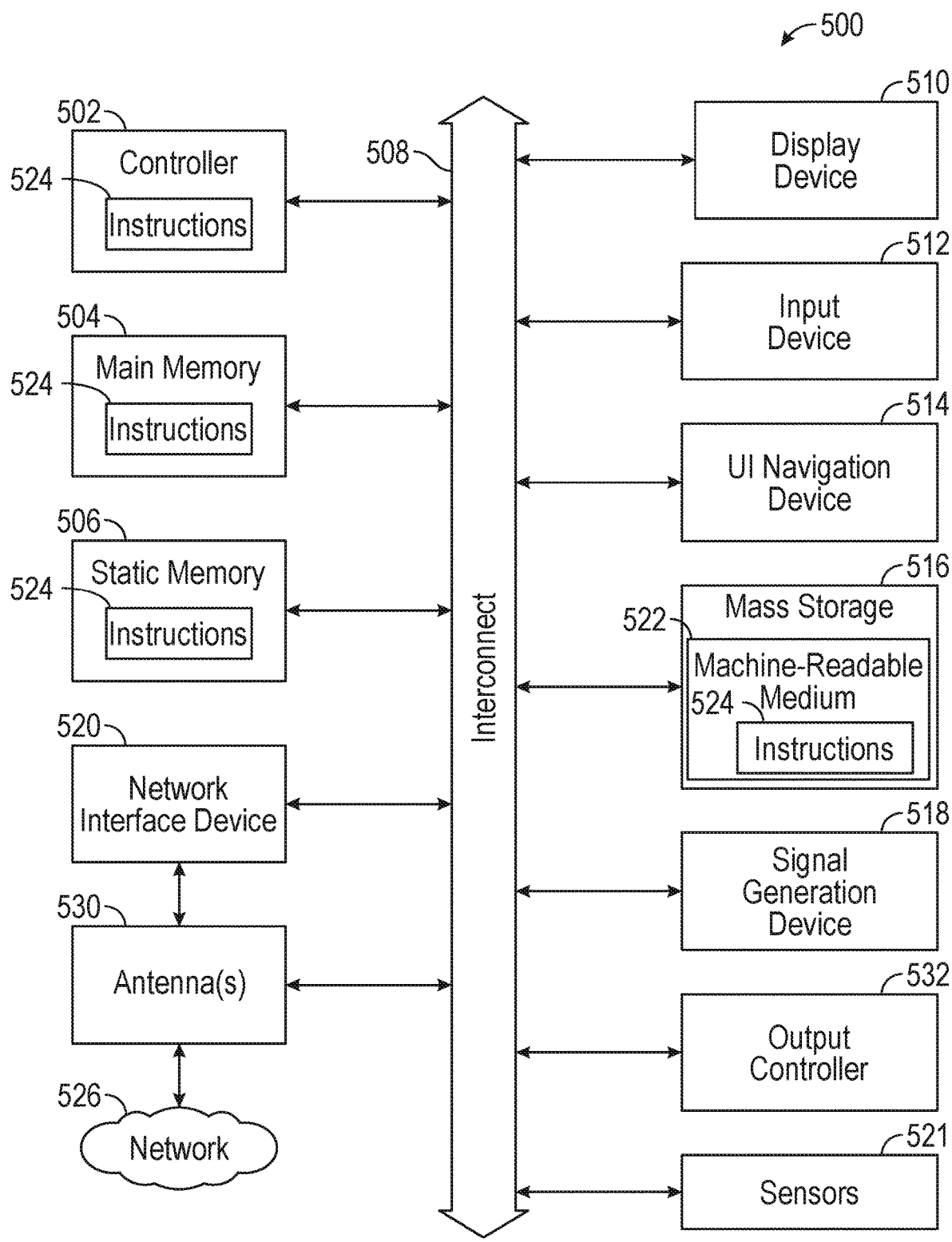
FIG. 5 illustrates a block diagram of an example machine for performing methods according to some aspects.

FIG. 5 illustrates a block diagram of an example machine 500 upon which any one or more of the techniques (e.g., methodologies) discussed herein may performed. In alternative aspects, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), unmanned aerial vehicle (UAV) or other vehicle, evolved Node B (eNB), next generation evolved Node B (gNB), next generation access network (AN), next generation user plane function (UPF), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a controller 502 (e.g., a hardware processor, a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521. The sensors 521 can include on-board vehicle sensors or other types of vehicle sensors such as speed sensors, etc. The sensors 521 can include sensors capable of detecting location or for utilizing a service for detecting or determining location, such as a global positioning system (GPS) sensor, compass, accelerometer, or other sensor. The sensors 521 can include sensors capable of detecting elevation. The machine 500 may include an output controller 532, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the controller 502 during execution thereof by the machine 500. In an example, one or any combination of the controller 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Figure 6:
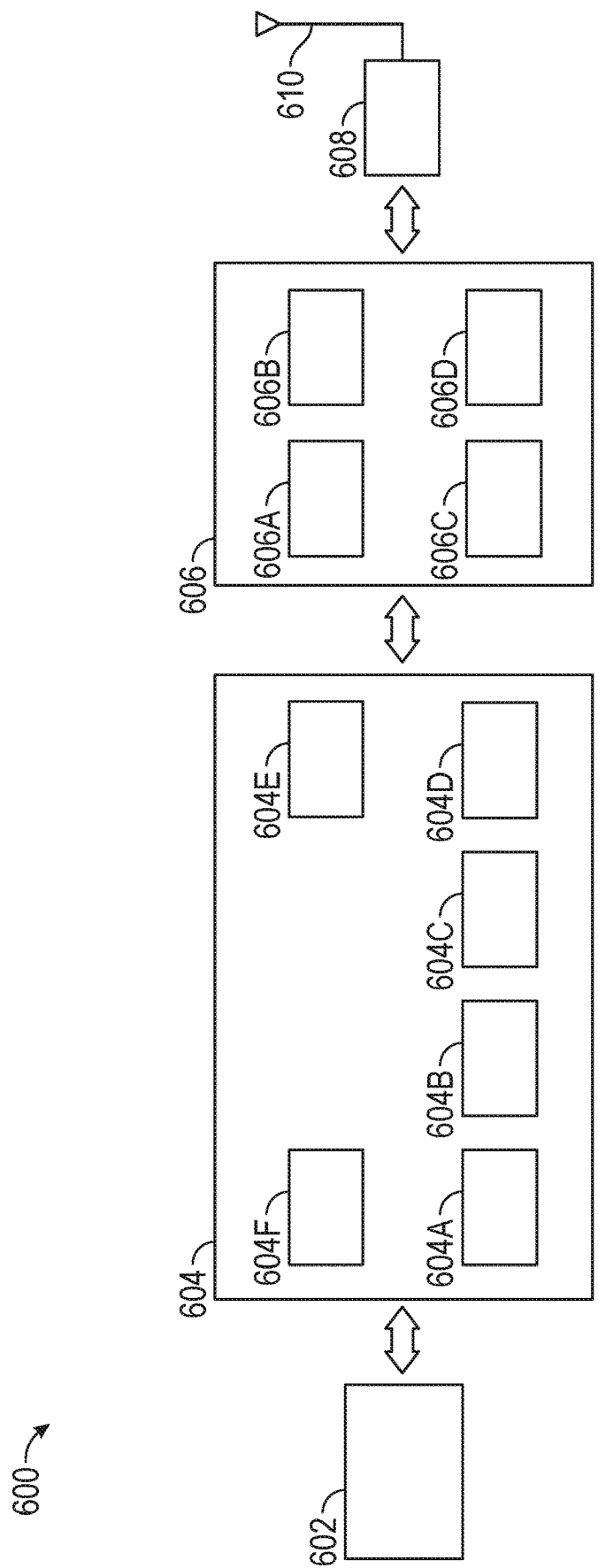
FIG. 6 illustrates an example of a user equipment (UE) device according to some aspects.

Aspects described herein may be implemented into a system using any suitably configured hardware and/or software. FIG. 6 illustrates, for one aspect, example components of a User Equipment (UE) device 600. In some aspects, the UE device 600 may include application circuitry 602, baseband circuitry 604, Radio Frequency (RF) circuitry 606, front-end module (FEM) circuitry 608 and one or more antennas 610, coupled together at least as shown. In some aspects, the UE can be a drone or UAV.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some aspects, the baseband circuitry 604 may include a second generation (2G) baseband processor 604A, third generation (3G) baseband processor 604B, fourth generation (4G) baseband processor 604C, and/or other baseband processor(s) 604D for other existing generations, generations in development or to be developed in the future (e.g., fifth generation (5G), 6G, etc.). The baseband circuitry 604 (e.g., one or more of baseband processors 604A-D) may handle various radio control functions that enable communication with one or more radio networks via the RF circuitry 606.

The radio control functions may include, but are not limited to, signal modulation/demodulation, encoding/decoding, radio frequency shifting, etc. In some aspects, modulation/demodulation circuitry of the baseband circuitry 604 may include Fast-Fourier Transform (FFT), precoding, and/or constellation mapping/demapping functionality. In some aspects, encoding/decoding circuitry of the baseband circuitry 604 may include convolution, tail-biting convolution, turbo, Viterbi, and/or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604E of the baseband circuitry 604 may be configured to run elements of the protocol stack for signaling of the PHY, MAC, RLC, PDCP and/or RRC layers. In some aspects, the baseband circuitry may include one or more audio digital signal processor(s) (DSP) 604F. The audio DSP(s) 604F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 604 and the application circuitry 602 may be implemented together such as, for example, on a system on a chip (SOC).

In some aspects, the baseband circuitry 604 may provide for communication compatible with one or more radio technologies. For example, in some aspects, the baseband circuitry 604 may support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various aspects, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some aspects, the RF circuitry 606 may include a receive signal path and a transmit signal path. The receive signal path of the RF circuitry 606 may include mixer circuitry 606A, amplifier circuitry 606B and filter circuitry 606C. The transmit signal path of the RF circuitry 606 may include filter circuitry 606C and mixer circuitry 606A. RF circuitry 606 may also include synthesizer circuitry 606D for synthesizing a frequency for use by the mixer circuitry 606A of the receive signal path and the transmit signal path. In some aspects, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some aspects, the output baseband signals may be zero-frequency baseband signals, although this is not a requirement. In some aspects, mixer circuitry 606A of the receive signal path may comprise passive mixers, although the scope of the aspects is not limited in this respect.

In some aspects, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by filter circuitry 606C. The filter circuitry 606C may include a low-pass filter (LPF), although the scope of the aspects is not limited in this respect.

In some aspects, the mixer circuitry 606A of the receive signal path and the mixer circuitry 606A of the transmit signal path may include two or more mixers and may be arranged for quadrature downconversion and/or upconversion respectively. In some aspects, the mixer circuitry 606A of the receive signal path and the mixer circuitry 606A of the transmit signal path may include two or more mixers and may be arranged for image rejection (e.g., Hartley image rejection). In some aspects, the mixer circuitry 606A of the receive signal path and the mixer circuitry 606A of the transmit signal path may be arranged for direct downconversion and/or direct upconversion, respectively. In some aspects, the mixer circuitry 606A of the receive signal path and the mixer circuitry 606A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode aspects, a separate radio IC circuitry may be provided for processing signals for each spectrum, although the scope of the aspects is not limited in this respect.

In some aspects, the synthesizer circuitry 606D may be a fractional-N synthesizer or a fractional N/N+1 synthesizer, although the scope of the aspects is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some aspects, the synthesizer circuitry 606D may be a fractional N/N+1 synthesizer.

In some aspects, frequency input may be provided by a voltage controlled oscillator (VCO), although that is not a requirement. Divider control input may be provided by either the baseband circuitry 604 or the applications processor 602 depending on the desired output frequency. In some aspects, a divider control input (e.g., N) may be determined from a look-up table based on a channel indicated by the applications processor 602.

Synthesizer circuitry 606D of the RF circuitry 606 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 606D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some aspects, the FEM circuitry 608 may include a TX/RX switch to switch between transmit mode and receive mode operation. The FEM circuitry 608 may include a receive signal path and a transmit signal path. The receive signal path of the FEM circuitry 608 may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some aspects, the UE device 600 may include additional elements such as, for example, memory/storage, display, camera, sensor, and/or input/output (I/O) interface.

Figure 7:
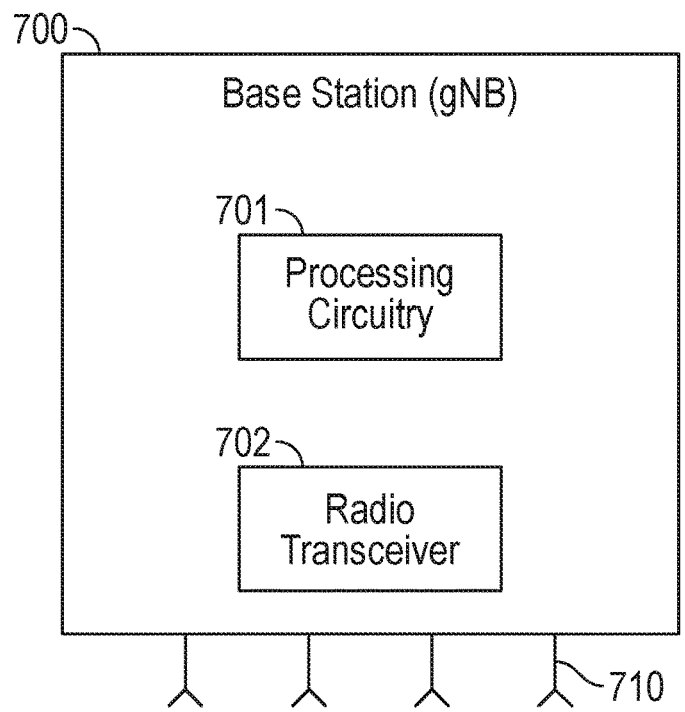
FIG. 7 illustrates an example UE and a base station (BS) such as an eNB or gNB according to some aspects.
Figure 7:
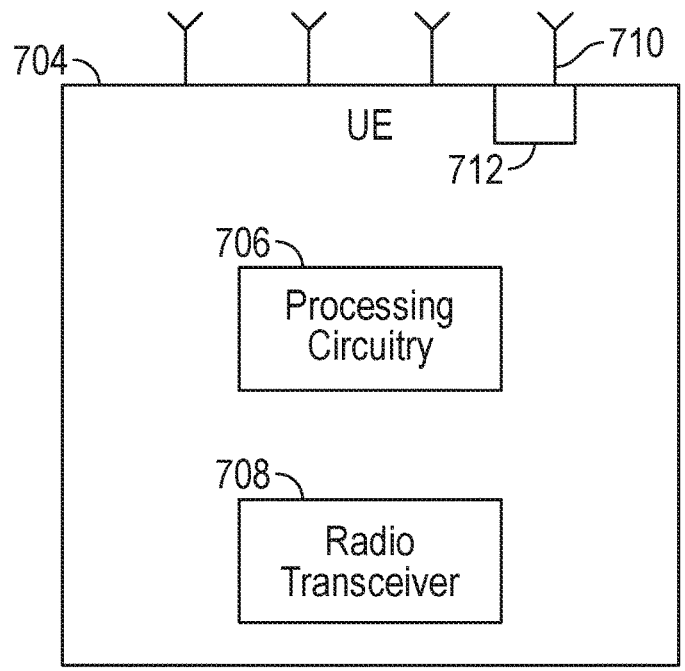

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 7 illustrates an example of the components of a UE 704 and a base station (e.g., eNB or gNB) 700. The BS 700 includes processing circuitry 701 connected to a radio transceiver 702 for providing an air interface. The UE 704 includes processing circuitry 706 connected to a radio transceiver 708 for providing an air interface over the wireless medium. Each of the transceivers in the devices is connected to antennas 710. The antennas 710 of the devices form antenna arrays whose directionality may be controlled by the processing circuitry. In examples, the antennas 710 can be coupled to electrical or mechanical apparatuses to tilt antennas 710 toward targeted cells. In examples, the antennas 710 can include at least two receiving antennas, and the at least two receiving antennas can include at least one omni-directional antenna and at least one directional antenna for measuring Reference Signal Received Power (RSRP) or a similar value. The memory and processing circuitries of the UE and/or BS may be configured to perform the functions and implement the schemes of the various aspects described herein. The UE can also be configured to operate as a drone or UAV.

Descriptions of Aspects

Drone Traffic Control Using Cellular Technology

Figure 8:
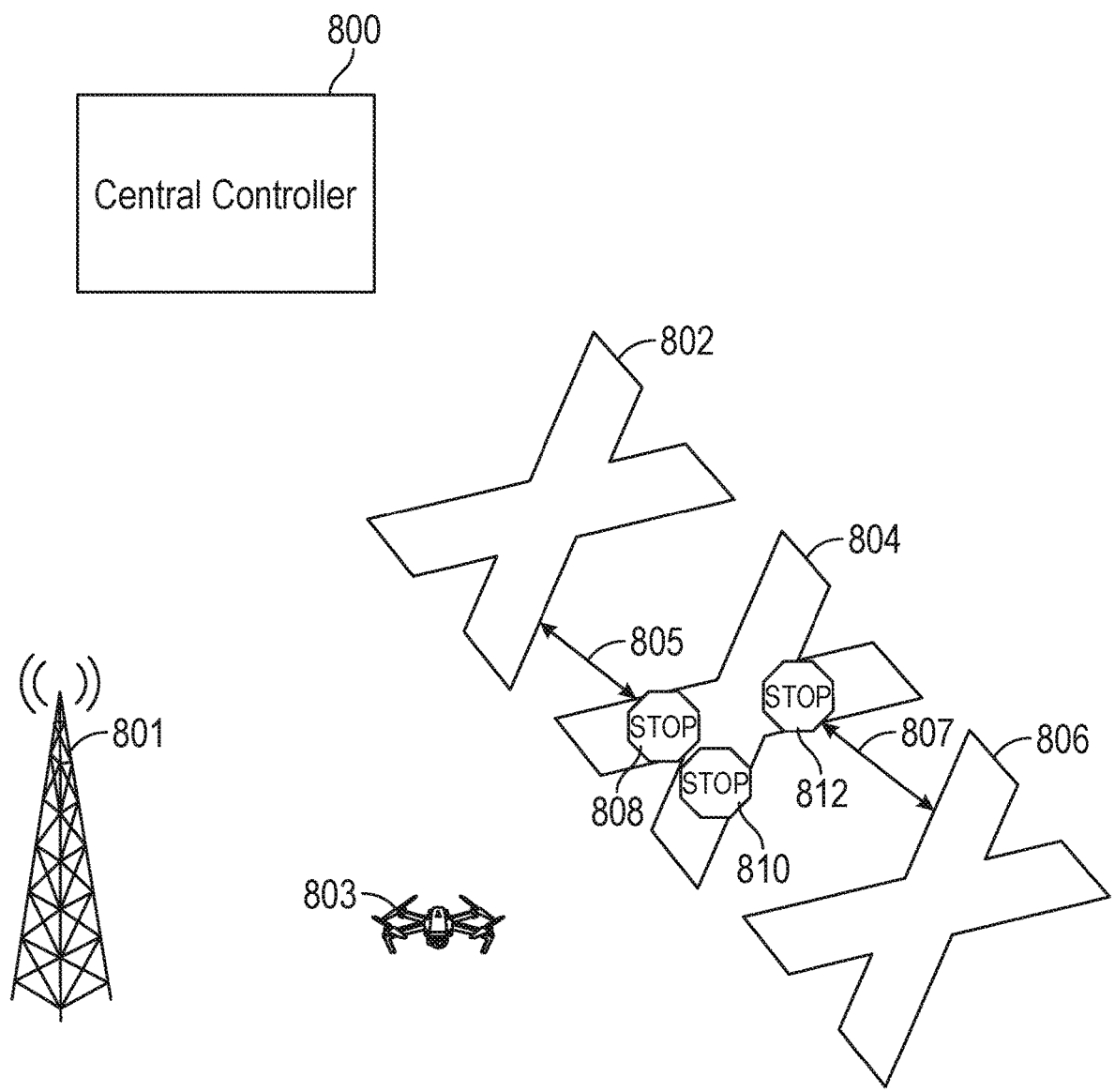
FIG. 8 illustrates traffic management in three dimensions according to some aspects.

Methods and apparatuses according to aspects can provide traffic management for drones, also referred to as UAVs. Methods and apparatuses can extend traffic management from 2D to 3D traffic management. FIG. 8 illustrates traffic management in three dimensions according to some aspects.

A central controller 800 can be operated by traffic control authorities for a region, district, municipality, etc. The central controller 800 can include components of the computing system 500 (FIG. 5). The central controller 800 can communicate wireless to BS 801. BS 801 can include elements of BS 700 (FIG. 7).

UAV 803 typically moves within "corridors," or flying paths in three-dimensional space. For example, UAV 803 can move in one of corridors 802, 804, or 806, wherein each corridor 802, 804, 806 may be spaced at an elevation 805, 807 relative to the other corridors. While three corridors are shown, there may be more or fewer than three corridors located within a region defined by geographical coordinates.

The traffic signs 808, 810, 812 may be physical signs. However, in some aspects, traffic control signaling will be communicated with wireless signaling ("virtual traffic signs"), rather than installations of physical signs, controlled by the central controller 800 and communicated by BS 801. In some aspects, the location of traffic control signaling can be communicated through use of maps.

In aspects, wireless signaling can also be provided for some non-UAV autonomous vehicles. Methods according to aspects provide signaling for movement in two dimensions or in three dimensions. Physical signs may also exist in each corridor 802, 804, 806 to control 2D movement within that corridor.

A virtual traffic sign can be defined by a location, where the location can include a point in 3D space where conditions of the virtual traffic sign apply.

The location can be specified as geographical coordinates and elevations/altitudes. The virtual traffic sign is further defined according to its type. For example, the type of virtual traffic sign can indicate whether the corresponding virtual traffic sign is a traffic allowance, a traffic direction, etc. The virtual traffic sign may exist temporarily or permanently, and values for the virtual traffic sign may vary with time or may be fixed. The virtual traffic sign may apply to all UAVs or only to certain UAVs based on priority and type of UAV. Some virtual traffic signs may apply to traffic traveling in two dimensions, whereas some virtual traffic signs may control vehicular movement in a third dimension. For example, some virtual traffic signs may indicate whether a UAV is permitted to move to a new elevation. The virtual traffic signs can be coded (e.g., by color or other mechanism) to specify traffic management in different dimensions. For example, a first color or code can specify that the virtual traffic sign relates to 2D flow management (left, right, straight). A second color or code can specify that the corresponding traffic management is for UAVs changing to a lower corridor (e.g., from corridor 804 to 806). A third color or code can specify that the corresponding traffic management is for UAVs changing to an upper corridor (e.g., from corridor 804 to 802).

Methods according to aspects can rely on a soft decision approach for traffic signs, rather than a hard decision approach. This is illustrated by comparing FIG. 9, which depicts a hard decision approach to detours, to FIG. 10, which depicts a soft decision approach for detours according to some aspects.

Figure 9:
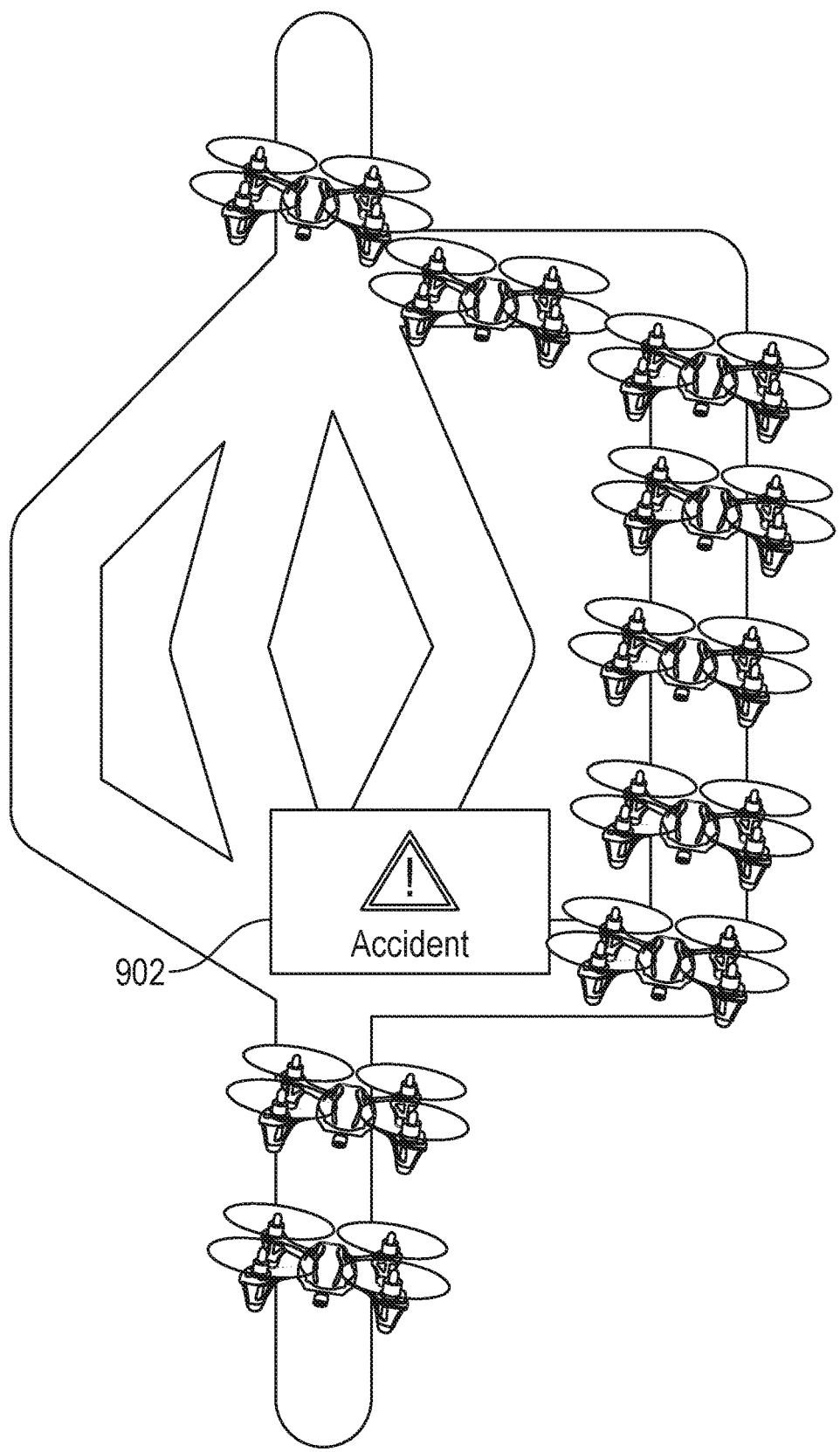
FIG. 9 illustrates a hard decision approach to traffic detours.
Figure 10:
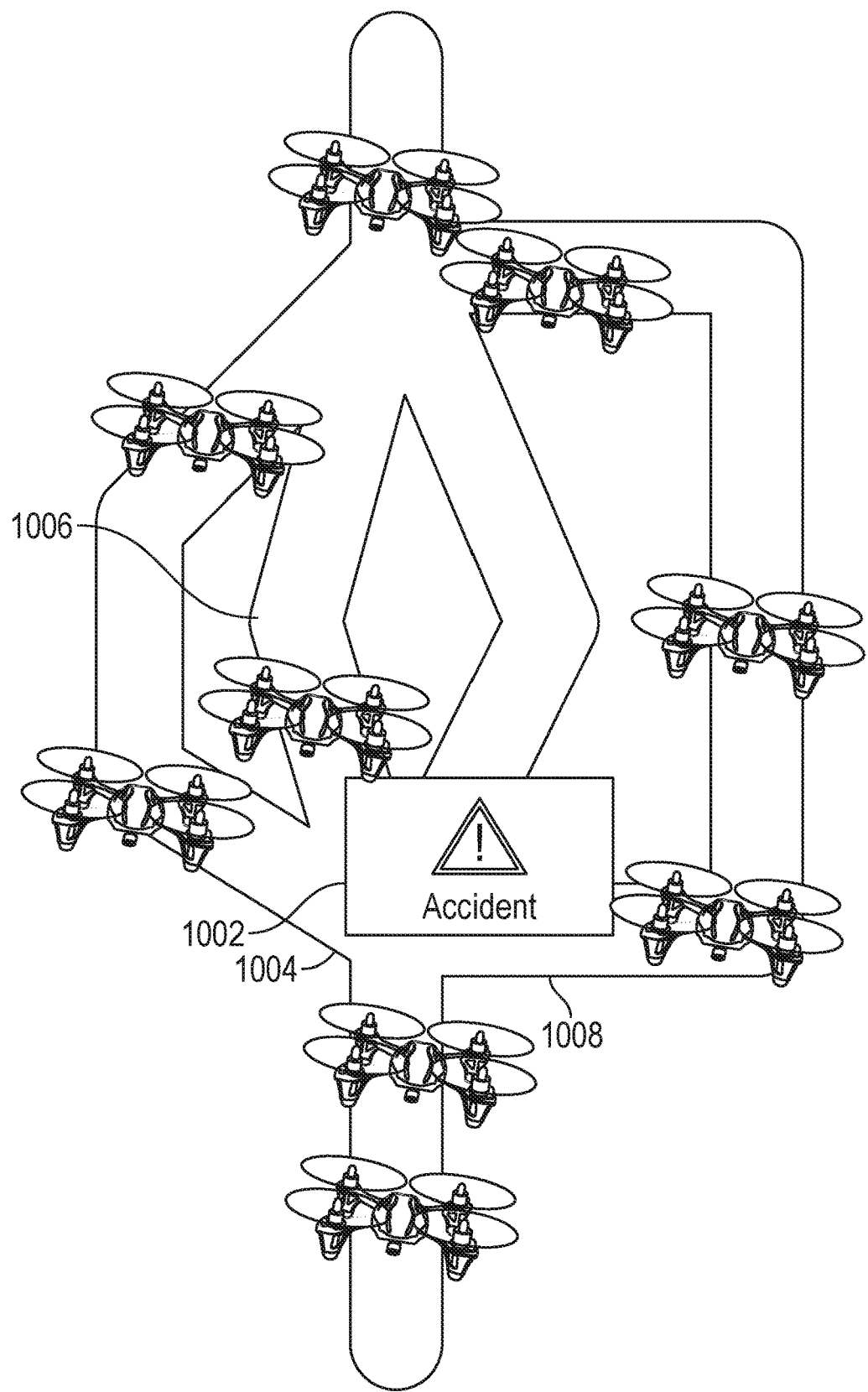
FIG. 10 illustrates a soft decision approach to traffic detours according to some aspects.

As shown in FIG. 9, if traffic is blocked at 902, all traffic is directed to the right in a hard decision. In contrast, in FIG. 10, given blockage 1002, some traffic (e.g., a percentage of traffic) can be directed to road 1004, other traffic can be directed to road 1006, and still other traffic can be directed to road 1008. In the case of UAV traffic, traffic can also be directed in a similar fashion between corridors (e.g., routes at different elevations). In at least these aspects, virtual traffic signs can include a probability that a particular UAV will take a particular route or go to a particular corridor.

Figure 11:
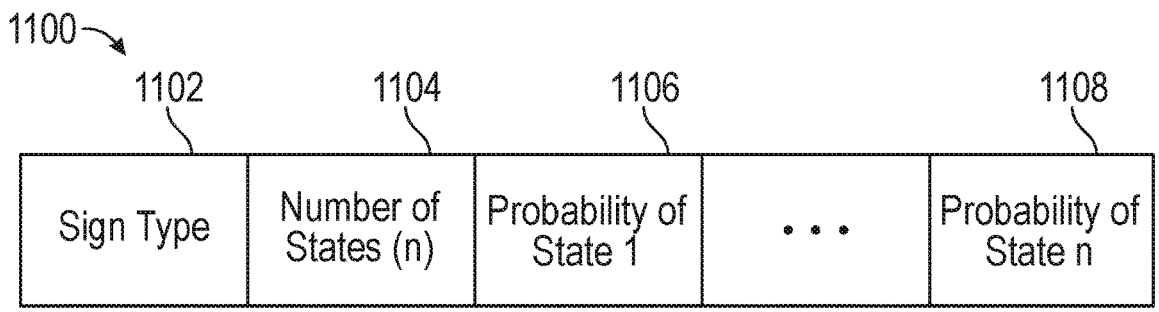
FIG. 11 illustrates an example message transmitted by a virtual traffic sign according to some aspects.

A message 1100 transmitted by that virtual traffic sign is illustrated in FIG. 11. The message 1100 can be configured by the central controller 800 and the central controller 800 can communicate the message to BS 801 over communications network 526 (FIG. 5).

The message 1100 can include a virtual traffic sign type field 1102. Examples of values include "stop sign," "traffic light," etc. The message 1100 can further include a number of states field 1104. For example, a "traffic light," can include states "RED" and "GREEN," in which case the number of states field 1104 will contain the value "2." The message 1100 can include additional fields 1106, 1108 indicating the probability that any of the states will apply to a particular UAV. For example, field 1106 can indicate the probability (e.g., indicated in percent likelihood) that the virtual traffic sign will have state 1 with respect to a particular UAV. Field 1108 can indicate the probability that the virtual traffic sign will have state n with respect to a particular UAV. Fields 1106, 1108 can also be associated to a probabilistic distribution such that one set of numbers, provided by the UAV, will be associated to a first state (e.g., virtual traffic sign value), and a second set of numbers will be associated to the nth state. The message can also include an indication of a plurality of traffic actions to take in response to the virtual traffic sign. Examples can include "turn right," "go up," etc.

Figure 12:
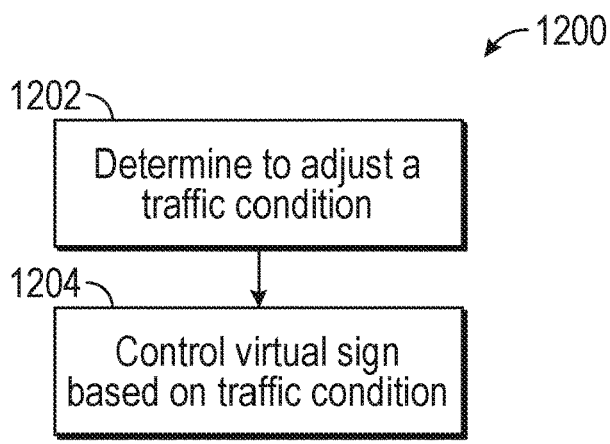
FIG. 12 illustrates a method for traffic control according to some aspects.

FIG. 12 illustrates a method 1200 for traffic control according to some aspects. The method 1200 can be implemented by the central controller 800 using components illustrated in FIG. 5 (e.g., hardware processor or controller 502).

The method 1200 begins with operation 1202 with the hardware processor making a determination to adjust a traffic condition. The determination can be based on detection of a road hazard, traffic jam, or other condition, or the determination can be based on historical data. For example, the determination can be made based on knowledge of peak traffic conditions during a day or other time period. The determination may be made based on reports from UAVs, traffic personnel, autonomous vehicles, etc.

The method 1200 continues with operation 1204 with the hardware processor controlling a virtual traffic sign based on the traffic condition. The hardware processor can control the virtual traffic sign by adjusting a message similar to message 1100 (FIG. 11). For example, the hardware processor can adjust the probability that a certain state of the virtual traffic sign will apply to a given UAV, or the hardware processor can change the type of the virtual traffic sign (e.g., from a stop sign to a turn signal).

The method 1200 can further include operations of adjusting parameters for the virtual traffic sign according to a machine-learning algorithm.

Adjustments can be made based on whether a traffic condition changed or worsened based on the control of the virtual traffic sign according to operation 1204. For example, in some aspects, the probability of a state being applicable to a virtual traffic sign can be reduced or increased if that state resulted in worse or improved traffic conditions. In other aspects, adjustments can be made based on changes in traffic conditions, regardless of whether a state was determined to worsen or improve the traffic conditions. Adjustments can be made to remove or change the virtual traffic sign periodically based on time of day or other factors.

Figure 13:
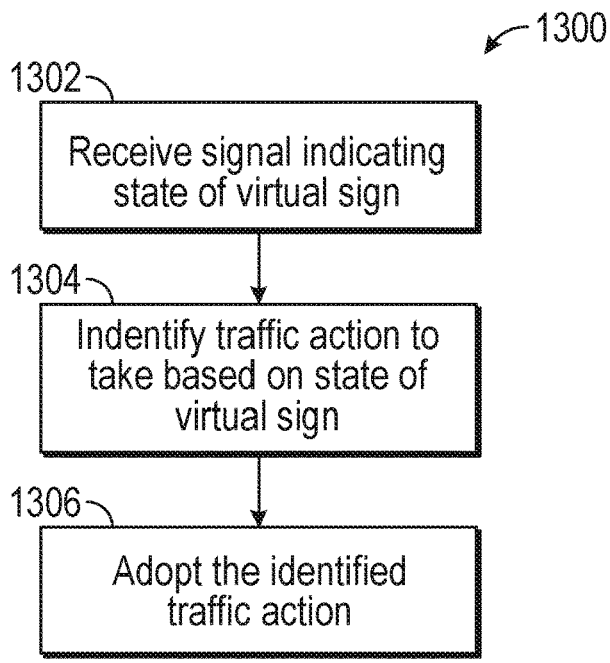
FIG. 13 illustrates a method for controlling a UAV according to some aspects.

FIG. 13 illustrates a method 1300 for controlling a UAV according to some aspects. The method 1300 can be implemented by the UAV 803 (FIG. 8) using components illustrated in FIG. 7 (e.g., processing circuitry 706).

The method 1300 begins with operation 1302 with the processing circuitry 706 receiving a signal that indicates a state of a virtual traffic sign. In some aspects, the state can include a message at least somewhat similar to message 1100 (FIG. 11).

The method 1300 continues with operation 1304 with identifying a traffic action to take based on the state of the virtual traffic sign. In some examples, the processing circuitry 706 may be directed to select a random number. The processing circuitry 706 can determine an applicable state of the virtual traffic sign that corresponds to that random number. For example, with reference to FIG. 11, field 1106 may be associated to a first set of numbers, and field 1108 may be associated with a second set of numbers, and the processing circuitry 706 will determine the applicable state based on whether the random number falls within the first set of numbers or the second set of numbers.

The method 1300 continues with operation 1306 with the UAV adopting the specified traffic action. For example, if the state of the virtual traffic sign (identified based on the selected random number) indicates that the UAV should change elevation, the UAV will change elevation.

In aspects, UAVs are categorized according to type. For example, a UAV can be classified as an emergency UAV, a police UAV, a public surveillance UAV, a private surveillance UAV, a freight UAV, a telecommunications UAV, an infrastructure monitoring UAV, a private leisure UAV, or other type of UAV. Based on the category, methods according to aspects can assign a priority to a UAV. Priority may be assigned based on local (e.g., national, regional or municipal) regulations. For example, a private leisure UAV may be assigned lowest priority, while an emergency UAV may be assigned highest priority.

UAV autonomy level can also be assigned. Such autonomy level may be at least somewhat similar to that provided in specifications according to the Society of Automotive Engineers (SAE) family of standards or as used by the 5G Automotive Association (5GAA). For example, a UAV may have automation level 0, in which the UAV has no automatic features and a remote pilot has full control of the UAV. A UAV may have automation level 1, in which the UAV has automation control for one or more control functions (for example, altitude control or stationary flight). A UAV may have automation level 2, in which the UAV has automation control for two or more control functions (for example, altitude control, stationary flight, or speed). At automation level 3, the UAV remote pilot does not constantly monitor the environment of the UAV. At automation level 4, the UAV can automatically perform flight functions (including take-off and landing) under certain conditions, but the remote pilot has the option to take control of the UAV at any point. At automation level 5, the UAV can automatically perform flight functions under all conditions, but the remote pilot still has the option to take control of the UAV at any point.

In some aspects, UAV traffic control can be broadcast by the cellular network using system information blocks, multimedia broadcast/multicast service (MBMS), or using PC5 sidelink communications. To enhance the robustness of the communication, a redundancy channel can be used for the wireless communication. The number of redundancy channels may depend on the UAV's priority or type. The resource selection by the UAV (Transmission mode 4—TM4) or the eNB/gNB (Transmission mode 3—TM3) may depend on the UAV's priority or type. For instance, the high priority UAV may have a dedicated resource block reserved.

In response to virtual traffic sign traffic control, in some aspects UAV operation can be controlled through direction of a remote operator (e.g., a remote control center) or through policies that are applied automatically.

Signaling can be extended to encompass UAV use cases. For example, the parameters defined in European Telecommunications Standards Institute (ETSI) specifications can be extended to include UAV use cases to notify UAVs of traffic rules including area restriction, altitude restriction, corridor restriction, speed limit, etc. The restrictions or limits can vary based on the UAV priority or UAV type.

New messages can be introduced (in ETSI specifications, for example ETSI TS 101 894-2 or other specifications) to allow a UAV to communicate regarding events such as change of line, change of direction, change of altitude, overtaking, UAV volume, etc., or to notify of takeoff and landing. According to one example, a parameter DriveDirection can be extended to include vertical movement (e.g., up and down). According to another example, a parameter TrafficRule can be extended to consider the priority type of a UAV. New parameters can be added to notify UAVs or autonomous vehicles about wireless (virtual) traffic signs or to notify of 3D transport pipes.

Messaging can also suggest restrictions to other UAVs to prevent other UAVs from entering a restricted area during a period of time (for example, during a takeoff or landing procedure). The restricted area can be defined using geographical coordinates and altitudes or using a zone identifier. The restricted area can be assigned to one or more UAVs. The restricted area can be specified during takeoff or landing either statically or dynamically. If done dynamically, a UAV can broadcast that the UAV will start a takeoff or landing procedure and indicate the coordinates (e.g., define a corridor). In other aspects, the UAV may negotiate restricted areas with nearby UAVs, or the UAV may first obtain permission from a traffic controller. The takeoff and landing procedure can be performed by the UAV itself, or the UAV may act upon commands from a control center on the ground or on another UAV.

Because a UAV can move in three dimensions, a UAV can overtake other UAVs by flying above or below other UAVs. Collision detection can be expanded to include warning messages that indicate the angle and direction used to overtake a UAV. Warning messages can be broadcast to the UAV being overtaken and to other nearby UAVs.

V2X Enhancement for Vehicle Steering Collaboration and Remote Control

In some situations, it may be desirable for a vehicle to take partially or completely control operations of another vehicle. For example, an emergency vehicle or police vehicle may need to take control over proximate autonomous vehicles. In other examples, one vehicle may not have complete visibility of the environment, but another nearby vehicle (e.g., drone, or UAV) may have improved visibility. The two vehicles may then collaborate and one vehicle can send control command to another vehicle.

Aspects provide methods for distributed control between vehicles using, for example, sidelink communication. Several control levels can be defined. According to aspects implementing high level control, the controlling device can transmit a global (high-level) command such as "stop car" and the car under control will operate all the necessary action to stop the car. According to aspects implementing low level control, the controlling device can transmit dedicated commands to operate other vehicle. The dedicate commands can include steering of the wheel, change of vehicle speed, and other limited operations.

In some aspects, control can be done remotely when a pilot or drive operates a UAV or remote vehicle. In other aspects, proximity control can be performed on a vehicle by a different proximate vehicle. In some aspects, vehicles may follow a lead vehicle/UAV, in a direction as needed by emergency/police vehicles. In some aspects, a combination of remote and proximity control can be implemented.

In aspects implementing proximity control, the controlling vehicle or device shall be in the reception range of the vehicle under control. The communication is performed using a PC5 sidelink connection. As an alternative the control protocol can be implemented on top of short range communication protocol such as Bluetooth or Wi-Fi. In such case a first pairing or association shall be performed before control is taken of the controlled vehicle. The controlling device can be a road-side unit (RSU). In another example, a RSU may control a vehicle to park or a UAV to land and takeoff. This may reduce the risk of collision and allow a good coordination of all vehicles needs to park or start. In aspects implementing remote control a different connectivity solution can be used including cellular communication under any cellular communication standards, such as LTE or 5G.

In yet other aspects, collaborative vehicle steering (or distributed control) can take place. In at least these aspects, a vehicle may partially take control over the controlled vehicle when the controlled vehicle has limited information or line-of-sight necessary to make steering decisions or other decisions. In one alternative, the controlling vehicle provides sensor information or other needed information to the controlled vehicle, using communications depending on proximity between the controlled and controlling vehicle. In these aspects, the controlled vehicle has full autonomy on steering using the provided information. In another alternative, the controlled vehicle can provide any available sensor information to the controlling vehicle, and the controlling vehicle thereafter takes control of steering, etc. for the controlled vehicle. In yet another alternative, the controlling vehicle may provide some steering commands to the controlled vehicle, but the controlled vehicle will rely on its own sensor data for steering where the sensor data is useful for steering. For example, the controlled vehicle may control speed but direction can be determined by the controlling vehicle. This can occur, for example, when the controlling vehicle is a UAV with improved line-of-sight to direct steering direction. Before starting distributive control, a handshake can be performed between the vehicles to share the type of sensor data available at each side and to agree on the split of the steering function between the vehicles.

In some aspects, more than one controlling vehicle may be capable of controlling the same controlled vehicle. In at least these aspects, priority can be defined so that the controlled vehicle can select which command to execute in case of conflicting commands. Doppler signals can be used to identify the direction of vehicle traffic to distinguish between traffic flowing in the same direction as an emergency responder, from traffic flowing in an opposite direction of the emergency responder. In some aspects, encryption levels of control messages can be adjusted. For example, when latency is not important, encryption may be increased. In contrast, in emergency or time-critical situations, encryption of control messages may be minimal. In such emergency situations, all nearby vehicles may be capable of decrypting control communications quickly.

Some aspects also provide for monitoring the behavior of a vehicle before taking control, and for modifying control type based on the observed behavior. For example, when a vehicle appears to be out of control because a driver is not reacting, the vehicle may be forced to be under remote or proximate control. At least these aspects are illustrated in FIG. 14.

Figure 14:
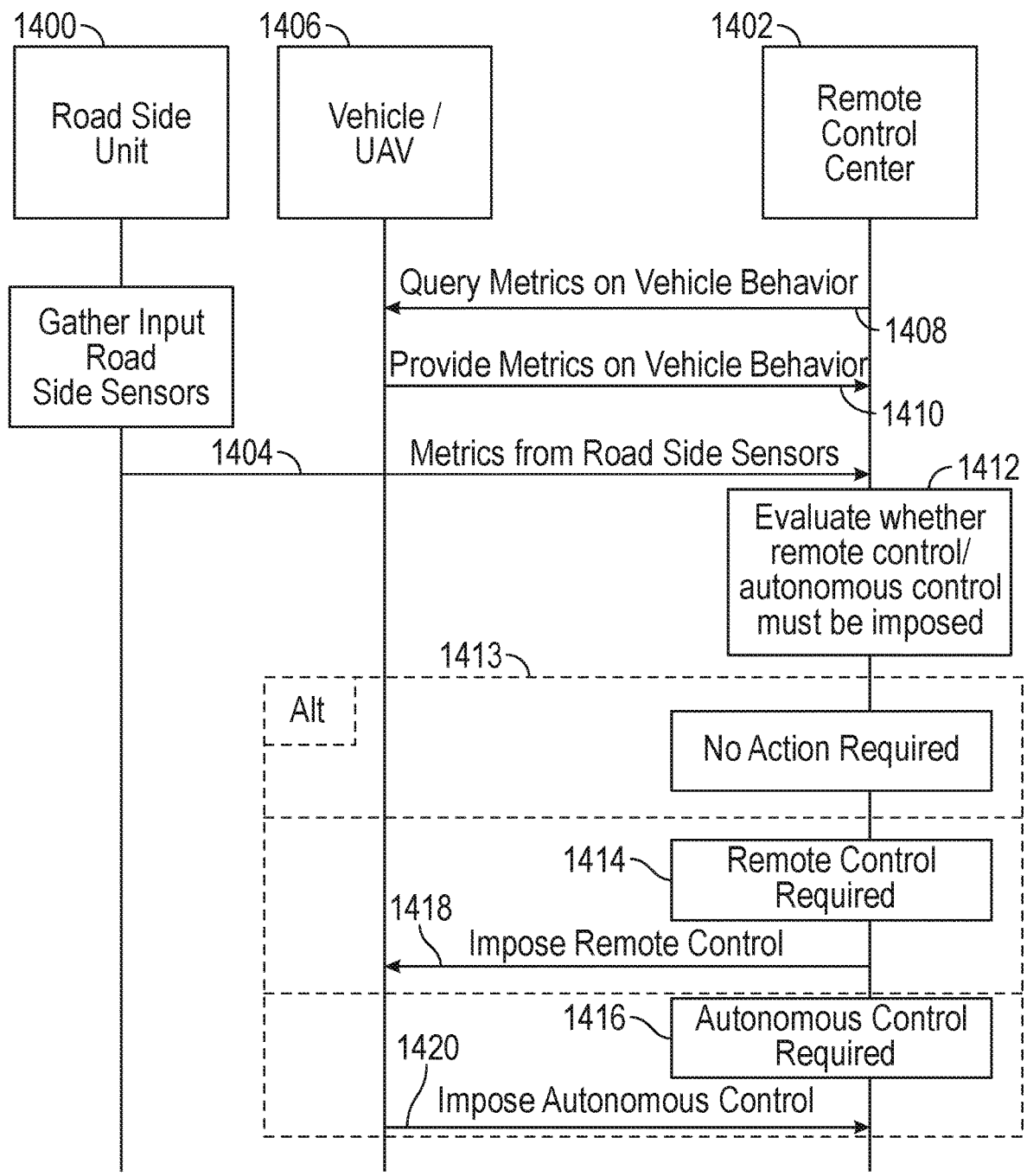
FIG. 14 illustrates an example of applying a vehicle control state based on a remote control center request according to some aspects.

FIG. 14 illustrates an example of applying a vehicle control state based on a remote control center 1402 request according to some aspects. The remote control center 1402 can include a system similar at least to system 500 (FIG. 5) and some operations can be implemented in a hardware processor or by antenna/s 530 communicating over network 526 to receive and transmit the signals described with reference to FIG. 14.

In at least some aspects, a RSU 1400 can gather input from road-side sensors and provide them to remote control center 1402 in a report at signal 1404. The vehicle/UAV 1406 can also include elements of a system 500 for implementing operations illustrated in FIG. 14. For example, the vehicle/UAV 1406 can include hardware processor and sensors 521 (e.g., in the form of onboard sensors, speed sensors, GPS, etc.). The hardware processor can therefore encode a report for transmission to a remote operator, the report including metrics on vehicle behavior based on inputs of at least one of sensor/s 521.

Road-side sensors can include radar, video camera, or sensors from other vehicles using sidelink communications, DSCR, or V2X. The remote control center 1402 can also query the vehicle/UAV 1406 at signal 1408 for metrics on vehicle/UAV 1406 behavior. The metrics can be provided by vehicle sensors 521 (e.g., onboard sensors, speed sensors, etc. as described above). The vehicle/UAV 1406 can provide the requested metrics at signal 1410. At operation 1412, the remote control center 1402 (e.g., hardware processor of the remote control center 1402) can evaluate whether remote control or other control should be imposed on the vehicle/UAV 1406. In decision block 1413, if no remote control is needed, no further action is taken by the remote control center. Otherwise, at operations 1414 and 1416, either remote or autonomous control is applied, respectively, using signals 1418 or 1420. In some aspects, vehicle/UAV hardware processor can evaluate reliability of sensors 521 before deciding whether and to what extent to implement remote control. In some aspects, the vehicle/UAV hardware processor can include decryption circuitry and can refrain from implementing remote control if the control signaling cannot be decrypted.

Figure 15:
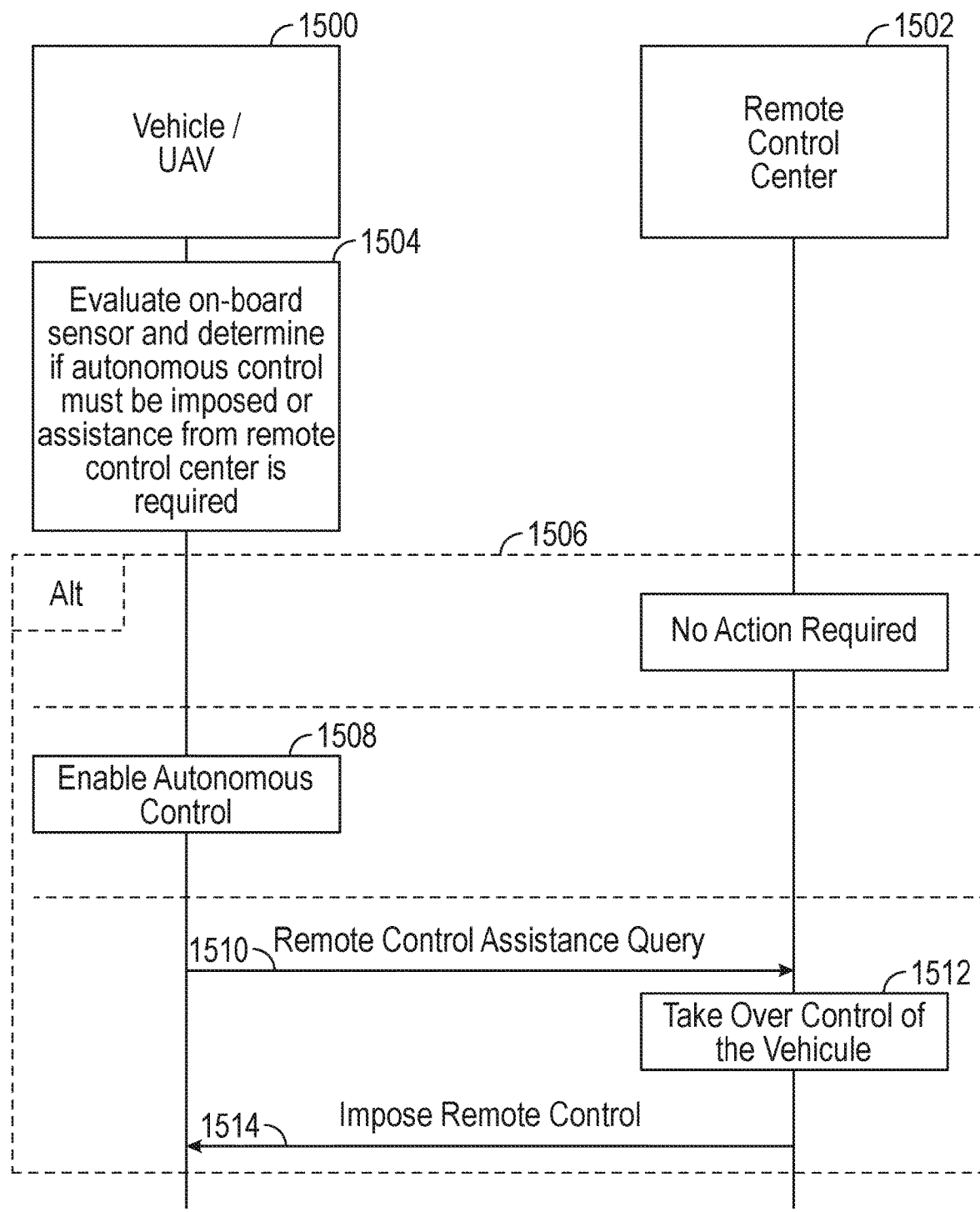
FIG. 15 illustrates an example of change of vehicle control state responsive to vehicle initiation according to some aspects.

FIG. 15 illustrates an example of change of vehicle control state responsive to vehicle initiation according to some aspects. A vehicle/UAV 1500 can include a system similar at least to system 500 (FIG. 5) and some operations can be implemented in a hardware processor or by antenna/s 530 communicating over network 526 to receive and transmit the signals described with reference to FIG. 15. Similarly, remote control center 1502 can include elements of a system similar to system 500.

In operation 1504, a vehicle/UAV hardware processor can evaluate on-board sensors to determine whether autonomous or remote control should be imposed by the remote control center 1502. In decision block 1506, if no action is required, then no control signal is sent from the remote control center 1502. If autonomous control is enabled at operation 1508, then the vehicle/UAV will operate without control from the driver. Otherwise, if the vehicle/UAV hardware processor determines that remote control assistance is desired, the vehicle/UAV hardware processor will encode a message 1510 for transmission to the remote control center 1502 request remote control assistance. In the case remote control assistance is desired, at operation 1512, the remote control center 1502 will take over control of the vehicle and transmit a signal 1514 imposing remote control of the vehicle/UAV 1500.

Figure 16:
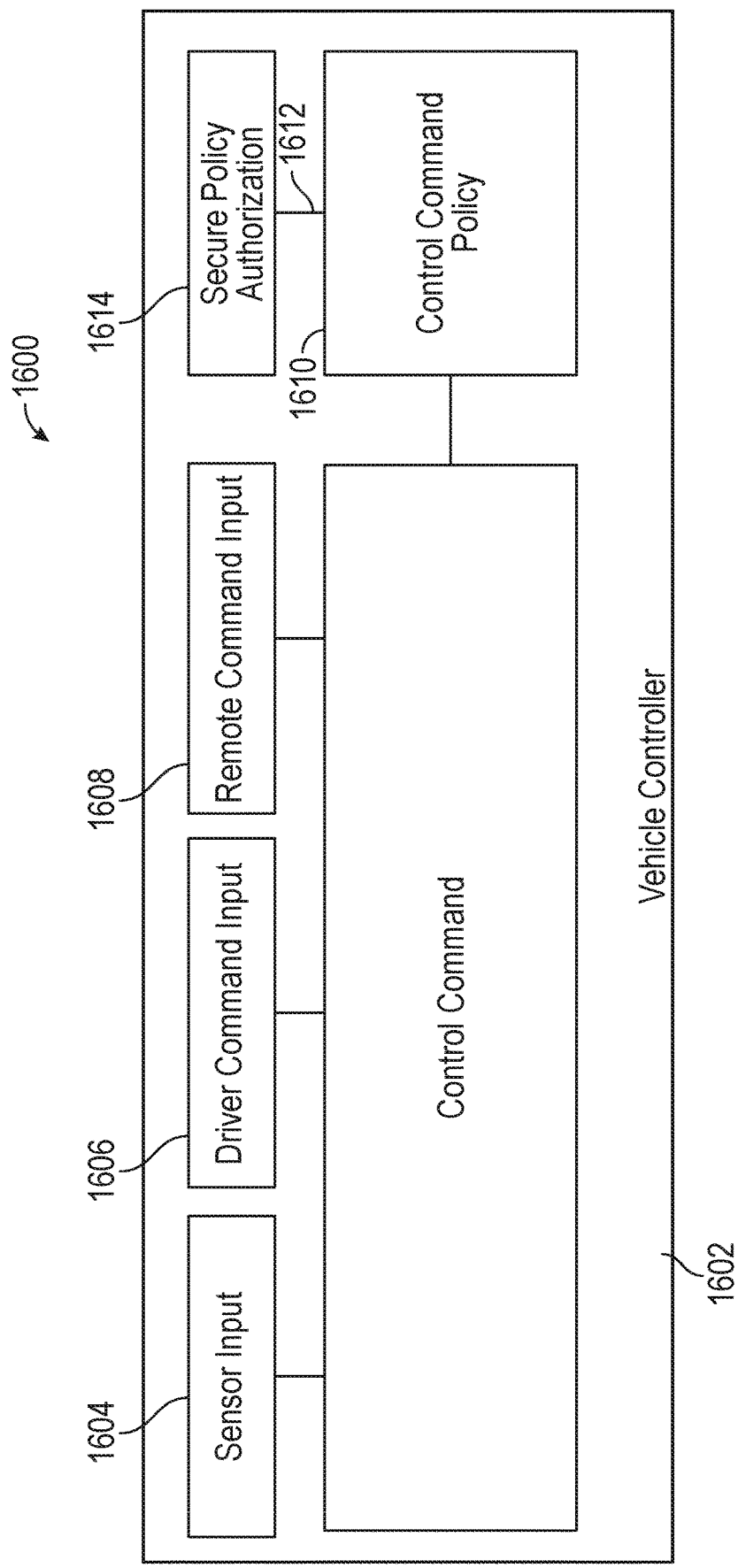
FIG. 16 illustrates an example architecture for vehicle control according to some aspects.

FIG. 16 illustrates an example architecture 1600 for vehicle control according to some aspects. A vehicle controller 1602 (which can include components of system 500, e.g., hardware processor or controller 502), can receive inputs from sensors 1604 of the vehicle/UAV. Communication can be over a communication bus (e.g., a bus according to a standard of the SAE family of standards. At least some of sensor 1604 can include sensors 521 (FIG. 5). Other inputs can come from driver commands 1606. Other inputs can come from remote command inputs 1608. Inputs 1604, 1606 and 1608 can conflict, and in such cases control command policies 1610 should be applied to help the vehicle controller 1602 determine which input to consider and, accordingly which control command to apply. The command control policies 1610 can be provided within the vehicle or adjusted or modified by a third party using a secured connection 1612 to secure policy authorization server 1614. A control bus such as a control bus according to a standard of the Society of Automotive Engineers (SAE) family of standards can communicate between any of sensor inputs 1604, drive command inputs 1606 and remote command inputs 1608 and the hardware processor. In some examples, a vehicle/UAV can be disabled if the vehicle/UAV is detected to be under malicious control or is detected to have been stolen.

In some aspects, a decision making hierarchy can be specified, such that a control having a higher hierarchy level takes priority over controls at lower hierarchy levels. In some aspects, a highest hierarchy level is assigned to driver commands, while a medium hierarchy level is assigned to remote controlled driving (e.g., by the vehicle manufacturer). A lowest hierarchy level can be assigned to autonomous driving capability in the vehicle/UAV. Hierarchy levels can be reassigned upon detection of certain conditions. For example, if a vehicle theft is detected, the control is taken away from the driver (e.g., driver commands can be assigned low or no hierarchy). In at least this use case, remote controlled driving may be assigned the highest hierarchy level, and a medium hierarchy level can be assigned to autonomous driving capability in the vehicle. If a defect is found in remote controlled driving capability, remote controlled driving may be reassigned to no or low hierarchy. Likewise, if a defect is found in autonomous driving capability, then autonomous driving may be reassigned to no or low hierarchy.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect. The scope of various aspects of the disclosure can be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate aspect.

EXAMPLES

Example 1 is a method for traffic control, the method comprising: detecting a traffic condition; determining whether to adjust a virtual traffic sign responsive to detecting the traffic condition; and adjusting the virtual traffic sign based on the traffic condition.

In Example 2, the subject matter of Example 1 includes, wherein adjusting the virtual traffic sign comprises encoding a message for transmission to a base station within a range of the virtual traffic sign, the message including at least one of a virtual traffic sign type and a virtual traffic sign value.

In Example 3, the subject matter of Examples 1-2 includes, wherein the message includes a plurality of virtual traffic sign values corresponding to at least one virtual traffic sign type, and wherein adjusting the virtual traffic sign further comprises adjusting a probabilistic distribution of virtual traffic sign values based on a change in the traffic condition.

In Example 4, the subject matter of Examples 1-3 includes, wherein the message further includes a percent likelihood that a virtual traffic sign value will apply to a vehicle being controlled according to the method.

In Example 5, the subject matter of Examples 1-4 includes, wherein the message further includes a location of the virtual traffic sign.

In Example 6, the subject matter of Example 5 includes, wherein the location is a three-dimensional (3D) location.

Example 7 is an apparatus for a vehicle, the apparatus comprising: a radio transceiver to receive communications in a wireless communication network; and processing circuitry coupled to the radio transceiver and configured to decode a message indicating a state of a virtual traffic sign; and identify a traffic action to take based on the state of the virtual traffic sign.

In Example 8, the subject matter of Example 7 includes, wherein the traffic action includes a direction to change elevation.

In Example 9, the subject matter of Examples 7-8 includes, wherein the message includes an indication of a plurality of traffic actions to take in response to the virtual traffic sign.

In Example 10, the subject matter of Examples 7-9 includes wherein the message includes an indication of a probability that a traffic action of the plurality of traffic actions is to be taken by the apparatus.

In Example 11, the subject matter of Examples 7-10 includes wherein the apparatus is assigned a priority, and wherein the probability is based on the priority.

In Example 12, the subject matter of Examples 7-11 includes wherein the apparatus is assigned an autonomy level and wherein the probability is based on the autonomy level.

In Example 13, the subject matter of Examples 7-12 includes wherein the vehicle includes an unmanned aerial vehicle (UAV).

In Example 14, an apparatus for a vehicle comprises a network interface device configured to communicate over a wireless communication network; at least one sensor to sense parameters of operation of the vehicle; and processing circuitry coupled to the network interface device and to the at least one sensor, the processing circuitry configured to encode a report for transmission to a remote control center, the report including metrics on vehicle behavior based on inputs of the at least one sensor; receive control signaling responsive to the report; and provide a control command based on the control signaling.

In Example 15, the subject matter of Example 14 includes wherein the control signaling includes a high-level command to control more than one function of the vehicle.

In Example 16, the subject matter of Examples 14-15 includes wherein the control signaling includes a dedicated command to control one function of the vehicle, and wherein the one function includes one of vehicle speed and vehicle direction.

In Example 17, the subject matter of Examples 14-16 includes wherein the control signaling is received over a PC5 sidelink connection.

In Example 18, the subject matter of Examples 14-17 includes wherein the control signaling is received over one of a Bluetooth or Wi-Fi connection.

In Example 19, an apparatus for a vehicle includes a communication bus and a hardware processor coupled to the communication bus and configured to receive control inputs over the communication bus from at least two of a vehicle sensor, a driver control input, and a remote command input, and determine which control input to apply based on a control command policy.

In Example 20, the subject matter of Example 19 includes wherein the control command policy includes a decision making hierarchy that applies higher level priority to one of the vehicle sensor, the driver control input, and the remote command input.

Example 21 is at least one machine-readable medium including instructions, which when executed by a machine, cause the machine to perform operations described with respect to Examples 1-20.

Example 22 is an apparatus comprising means for performing any of the methods of Examples 1-20.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

The invention claimed is:

1. An apparatus for a vehicle, the apparatus comprising:
   a radio transceiver to receive communications in a vehicle-to-everything; (V2X) wireless communication network; and
   processing circuitry coupled to the radio transceiver and configured to:
      decode a message indicating a state of a plurality of states of a virtual traffic sign associated with a flying path in a three-dimensional space, wherein:
         the virtual traffic sign is associated with traffic control signaling received by the radio transceiver via the V2X wireless communication network; and
         the message further indicates a total number of states of the plurality of states and a probability for each particular state of the plurality of states that the particular state will apply to the vehicle; and
      identify a traffic action to take based on the state of the virtual traffic sign, the total number of states, and the probability for each particular state of the plurality of states that the particular state will apply to the vehicle.

2. The apparatus of claim 1, wherein the traffic action includes a direction to change elevation.

3. The apparatus of claim 1, wherein the traffic control signaling includes an indication of a plurality of traffic actions to take in response to the virtual traffic sign.

4. The apparatus of claim 3, wherein the traffic control signaling includes an indication of a probability that a traffic action of the plurality of traffic actions is to be taken by the vehicle.

5. The apparatus of claim 4, wherein the apparatus is assigned a priority, and wherein the probability that the traffic action of the plurality of traffic actions to be taken by the vehicle is based on the priority.

6. The apparatus of claim 4, wherein the apparatus is assigned an autonomy level and wherein the probability that the traffic action of the plurality of traffic actions to be taken by the vehicle is based on the autonomy level.

7. The apparatus of claim 1, wherein the vehicle includes an unmanned aerial vehicle (UAV).

* * * * *

UNITED STATES PATENT AND TRADEMARK OFFICE
CERTIFICATE OF CORRECTION

| | |
|---|---|
| PATENT NO. | : 11,087,630 B2 |
| APPLICATION NO. | : 16/235258 |
| DATED | : August 10, 2021 |
| INVENTOR(S) | : Parron et al. |

It is certified that error appears in the above-identified patent and that said Letters Patent is hereby corrected as shown below:

In the Claims

In Column 25, Line 38, in Claim 1, delete "vehicle-to-everything;" and insert --vehicle-to-everything-- therefor Signed and Sealed this
Twenty-fourth Day of May, 2022

Katherine Kelly Vidal
*Director of the United States Patent and Trademark Office*